United States Patent [19]
Takakura et al.

[11] Patent Number: 4,931,314
[45] Date of Patent: Jun. 5, 1990

[54] METHOD FOR PREVENTING HARDENED CEMENTITIOUS MATERIAL FROM DETERIORATING

[75] Inventors: Makoto Takakura; Takahiro Hori; Yuriko Sakaguchi; Yuji Nakamura, all of Funabashi, Japan

[73] Assignee: Nissan Chemical Industries Ltd., Tokyo, Japan

[21] Appl. No.: 256,941

[22] Filed: Oct. 13, 1988

[30] Foreign Application Priority Data

Oct. 15, 1987 [JP] Japan .................. 62-258429

[51] Int. Cl.$^5$ .............................. B32B 35/00
[52] U.S. Cl. .................. 427/140; 427/403
[58] Field of Search .................. 427/140, 403

[56] References Cited
U.S. PATENT DOCUMENTS 4,536,417  8/1985  Shimizu .................. 427/140
4,559,241 12/1985  Obitsu et al. .................. 427/140

FOREIGN PATENT DOCUMENTS 17-22957   11/1942  Japan .
57-11988    3/1982  Japan .
61-256961  11/1986  Japan .
62-265189  11/1987  Japan .

Primary Examiner—Michael Lusignan
Attorney, Agent, or Firm—Sughrue, Mion, Zinn, Macpeak & Seas

[57] ABSTRACT

The invention is a method for preventing a hardened cementitious material from deteriorating or for repairing a deteriorated cementitious material, and more particularly to such method for the hardened cementitious material comprising metal materials to be corroded by a salt content and cause alkali-aggregate. It is characterized by applying a cement paste, mortar or concrete added with 1-25 weight % lithium nitride relative to the cement content so as to cover the surface of hardened cementitious material.

3 Claims, No Drawings

METHOD FOR PREVENTING HARDENED CEMENTITIOUS MATERIAL FROM DETERIORATING

FIELD OF THE INVENTION

The invention relates to a method for preventing a hardened cementitious material from deteriorating or repairing a deteriorated cementitious material, and more particularly to such method for the hardened cementitious material comprising metal materials to be corroded by a salt content and cause alkali-aggregate reaction.

BACKGROUND OF THE INVENTION AND RELATED PRIOR ARTS

It is well known that the hardened cementitious material such as cement paste, mortar, concrete etc, is gradually deteriorated in the natural environment from the surface thereof. When such contains steel materials, there is caused rust in said materials as said deterioration progresses so as to generate cracks in the hardened material. In the cementitious material in which the aggregate to cause alkali-aggregate reaction is arranged, the material is swelled as the reaction progresses so as to generate cracks.

As a method for preventing such hardened cementitious material and repairing such deteriorated material, Japanese KOKOKU Gazette Sho 42(1967)-22957 (laid open for public inspection) discloses cement composition added with calcium nitrite. Japanese KOKOKU Gazette Sho 57(1982)-11988 proposes a process comprising steps of coating the surface of the deteriorated cementitious material with aqueous solution of a silicate and then with cement paste which may contain a rust inhibitor.

Japanese KOKAI Gazette Sho 61(1986)-256951 (laid early open) discloses combining of lithium nitrite in cementitious material comprising the aggregate which is to cause alkali-aggregate reaction. In KOKAI Gazette Sho 62(1987)-265189, there is described a method of covering the concrete surface with a sheet or a mat impregnated with aqueous solution of a nitrite.

According to the method of said KOKOKU Gazette Sho 42-22957 in which calcium nitrite is added to the cement composition, however, when the amount of calcium nitrite added in usual Portland cement is increased up to about 5 weight % in relation to cement content, unusual setting directly after kneading or excessive shortening of setting time which adversely affects on the workability of the concrete.

According to the method of said KOKOKU Gazette Sho 57-11988 where aqueous solution of a silicate is applied on the concrete surface, the rust inhibitor in the cement paste then applied can not penetrate into the inner portion. It is silent of what sort of rust inhibitor is to be used.

Said KOKAI Gazette Sho 61-256951 is silent of how aqueous solution of lithium nitrite penetrates the hardened concrete from the surface. According to the usual applying method, such solution cannot penetrate into the inner portion of the concrete.

It is possible to make aqueous solution of lithium nitrite to penetrate into the inner portion according to the method disclosed in said KOKAI Gazette Sho 62-265189, but it is inadvantageous that troublesome after treatments such as filling up of broken off portions and covering up the surface with cement paste, cement mortar etc. are necessary.

Thus, an object of the invention or technical problem to be dissolved in this field is to provide a method for applying a treatment agent so as to penetrate into the inner portion of the hardened cementitious material and so as to prevent the steel materials embedded in said cementitious material from being corroded and hinder the alkali-aggregate reaction, without necessity of troublesome after treatments.

The other advantages will be appreciated by reading the following explanations to be made in further detail.

DETAILED EXPLANATION OF THE INVENTION

The invention lies in applying cement paste, cement mortar or concrete added with 1–25 weight % of lithium nitrite relative to cement content therein on the surface of the hardened cementitious material, which may be applied to the material where deterioration has not yet been caused or is actually progressing.

The invention may be preferably applied particularly to the concrete material in which corrosive metallic material such as steel frames, steel rods etc. or such to cause alkali-aggregate reaction are burried.

Cement paste, cement mortar or concrete used in the invention is readily prepared by adding aqueous solution of lithium nitrite which may be suitably diluted with water. Application method may be any of the usual methods such as troweling, spraying or placing in molding box.

A sort of cement is not particularly limited and any of usual Portland cement, rapid-hardening Portland cement, alumina cement, fly ash cement, blast furnace cement, silica cement and various mixture cements may be limited. An aggregate is not particularly limited and any of sand, pebbles, gravels, rubbles and other synthetic aggregates may be used depending on the use.

Suitable additives may be mixed with said cement paste, cement mortar and concrete so far as such addition does not adversely affect on the object of the invention, which are e.g. aqueous emulsion of synthetic resins or synthetic rubbers. Such additives may improve adhesiveness to the surface of the hardened cementitious material as well as lower water and air penetration. Usual additive for improving concrete workability and calcium nitrite for accelerating setting and capable of increasing concentration of nitrous acid ion to be given may be added.

It is possible to apply finish coating after cement paste, cement mortar and concrete is applied and hardened.

When the amount of added lithium nitrite is more than 25 weight % relative to cement content there is caused a problem of workability such as extended setting time, and if it is less than 1 weight % the object can not be satisfactorily attained.

When cementitious meterial added with lithium nitrite in a suitable amount in said range is applied on the hardened material surface, said compound can gradually penetrate, so that inner and deeper portions are impregnated therewith.

Conventional concrete treatment agents are all applied as they are on the surface by brushing, spraying or, rolling so that the liquid agents can not sufficiently penetrate into deeper portions. A sheet or mat impregnated with the liquid agent can not be laid on the concrete surface naturally for a so long time.

Contrarily, lithium nitrite mixed in cementitious material may gradually penetrate in a considerable long time in deeper portions so that nitrous acid ion may prevent steel from rusting and lithium may inhibit undesirable alkali-aggregate reaction.

EXAMPLE 1

In a mold box of 5×5×20 cm in which a polished bar steel of 1 cm diameter and 18 cm length (SGD-3 in JIS G3108) is set by a spacer at the longitudinal center, mortar comprising 1 weight part of Portland cement, 2 weight parts of standard sand from Toyoura, Japan and 0.6 weight parts of saline solution (3% NaCl) is placed.

One day after, the mold box and the spacer are removed, and one end of said steel bar is fixed with a lead wire with electrically conductive adhesive and sealedly covered with silicone resin. The cement mortar was subjected to setting for 28 days at a temperature of 20° C. in wet air of relative humidity above 90% so as to prepare a sample for corrosion test.

Then, cement mortar for covering said hardened cement mortar was prepared by kneading 1 weight part of portland cement, 2 weight parts of standard sand of Toyoura, 0.4 weight parts of 25% aqueous solution of lithium nitrite and 0.2 weight parts of water and applied on said sample except the opposite ends sealedly covered with silicone resin to cover the four surfaces in 5 mm thickness.

After subjecting the sample to setting for 7 days at a temperature of 20° C. in wet air of relative humidity above 90%, 90 cycles of test was carried out, each of which consist of leaving the sample in wet air of relative humidity above 90% at a temperature of 60° C. for 3 days and in dry air of relative humidity of 60% at a temperature of 15° C. for 1 day.

Every 10 cycles, half-cell potential of the steel aggregate embedded in the sample was measured by using copper-copper sulfate electrodes. After the test of 90 cycles was over, the sample was broken to take out the steel bar of which rusted area rate and corrosion weight loss were determined. A color reagent for nitrous acid ion (acid solution of sulfamilamide and naphthylethylene diamine in acetic acid) was sprayed on the surface of the broken samples so as to determine the depth of nitrous acid penetration. The results are shown in following Tables 1 and 2.

COMPARATIVE TEST 1

Sample was prepared like as in Example 1 except that covering cement mortar was not applied so as to determine half-cell potential, rusted area rate, and corrosion weight loss, which are also shown in Tables 1 and 2.

COMPARATIVE TEST 2

Sample was prepared like as in Example 1 except that covering mortar of 1 weight part of Portland cement, 2 weight parts of standard sand of Toyoura and 0.6 weight parts of water but without lithium nitrite was applied so as to determine the half-cell potential, the rusted area rate, and corrosion weight loss, which are shown also in Tables 1 and 2.

COMPARATIVE TEST 3

Sample was prepared like as in Example 1 except that covering cement mortar of 1 weight part of Portland cement, 2 parts of standard sand of Toyoura, 0.1 weight part of 30% aqueous solution of calcium nitrite instead of lithium nitrite and 0.53 weight part of water was applied so as to determine half-cell potential, rusted area rate, corrosion weight loss and penetration depth, which are shown also in Tables 1 and 2.

Another sample prepared by applying covering cement mortar combined with 30% solution of calcium nitrite in the amount of 0.2 weight parts could not be tested due to unusually delayed setting.

TABLE 1

| | | Natural Electrode Potential | | | |
|---|---|---|---|---|---|
| | | Examp. 1 | Comp. T.1 | Comp. T.2 | Comp. T.3 |
| Test Cycles | 0 | −475 | −500 | −430 | −445 |
| | 20 | −490 | −515 | −490 | −480 |
| | 30 | −360 | −530 | −550 | −475 |
| | 40 | −210 | −610 | −570 | −430 |
| | 50 | −180 | −600 | −565 | −415 |
| | 60 | −160 | −650 | −615 | −405 |
| | 90 | −150 | −620 | −630 | −420 |

TABLE 2

| | Rust, Corrosion and Penetration | | | |
|---|---|---|---|---|
| | Exmp. 1 | Comp. T.1 | Comp. T.2 | Comp. T.3 |
| Rusted Area Rate % | 12 | 100 | 100 | 87 |
| Corrosion Loss % | 0.8 | 5.3 | 4.1 | 3.2 |
| Penetration | Into Center | — | — | Into Center |

When comparing the results of Example 1 and Comparative Tests 1–3, it is obvious that lithium nitrite is transferred from the covering cement mortar to penetrate into the base body mortar to prevent the steel materials from rusting. It will be understood that covering cement mortar added with calcium nitrite can attain rust preventing effect to a certain degree but the effect is still insufficient.

EXAMPLE 2

As a harmful aggregate to cause the alkali-aggregate reaction, Pyrex glass was ground to prepare glass powder comprising 10 weight parts of particles having size distribution ranging from 4.75 to 2.36 mm, 25 weight parts of particles having size distribution of 2.36–1.18 mm, 25 weight parts of particles of 1.18 mm—600 μm size distribution, 25 weight parts of particles of 600–300 μm and 15 weight parts of 300–15 μm.

Then, cement mortar was prepared by mixing Portland cement with a mixture of standard sand of Toyoura and said pulverized Pyrex glass in the ratio of 2:3, so as to be in the ratio of 1:2.25, to which sodium chloride was added in such an amount that 0.8% alkali content calculated as $Na_2O$ of Portland cement may be 1.2%. Then, water was added in the amount of 50 weight % relative to the cement to be well kneaded and molded in dimension of 4×4×16 cm.

One day after the cement placing and molding, the molded sample was removed and the molded cement mortar was subjected to setting in a wet box for three days.

Covering cement mortar was prepared by kneading a mixture of 1 weight part of Portland cement, 2 weight parts of standard sand of Toyoura, 0.4 weight parts of 25% aqueous solution of lithium nitrite and 0.2 weight parts of water to be applied on said sample to cover the four surfaces except the opposite end surfaces in 5 mm thickness. The coated sample was subjected to setting in wet atmosphere for further 14 days.

In the opposite ends of the sample, plugs for determining length change were embedded in advance so that length change rates were periodically determined during the long setting in a chamber of constant temperature and humidity at 40° C. and relative humidity above 95%, the results of which are shown in following Table 3.

COMPARATIVE TEST 4

A sample was prepared like as in Example 2 except that a covering cement mortar of 1 weight part of Portland cement, 2 weight parts of standard sand of Toyoura and 0.6 weight parts of water but without addition of lithium nitrite was applied, the results of which are shown also in Table 3.

TABLE 3

| | Length Change Rate $\times 10^{-4}$ | |
|---|---|---|
| Sample Age | Exampl. 2 | Comp. T.4 |
| 2 Weeks | 4 | 3 |
| 4 Weeks | 10 | 13 |
| 8 Weeks | 12 | 22 |
| 3 Months | 14 | 38 |
| 6 Months | 15 | 43 |

In Example 2, the length change rate is made almost constant after 4 weeks, which shows that swelling is suppressed according to the invention.

EXAMPLE 3

A plurality of cement mortar samples were prepared by adding lithium nitrite to powder mixture of 1 weight part of Portland cement and 2 weights of standard sand of Toyoura respectively in the amount of 0, 5, 10, 15, 20 and 25 weight % relative to cement and kneaded with adding water in the ratio of 0.65 relative to cement. Then setting time and adhesive strength of said samples were determined in a chamber at a temperature of 20° C. and of a relative humidity above 80%. The compression strength was determined after setting in water of 20° C. respectively for given days, the results of which are shown in following Table 4.

EXAMPLE 4

A resin combined cement mortar sample was prepared by adding 13.3 weight parts of 25% aqueous solution of lithium nitrite and 7.4 weight parts of styrene-butadiene latex (45% solid content) to 100 weight parts of the powder mixture in Example 3 so as to determine setting time, compressive strength and adhesive strength, the results of which are shown also in Table 4.

COMPARATIVE TEST 5

A plurality of cement mortar samples were prepared like as in Example 3 except that calcium nitrite was used instead of lithium nitrite so as to determine setting time, compressive strength and adhesive strength, of which results are shown also in Table 4.

TABLE 4

| | | Properties Of Covering Mortar | | | | |
|---|---|---|---|---|---|---|
| | | Setting time Hour:Minute | | D setting | | E Setting |
| | | Start | End | 3 Days | 7 Days | 28 Days | 14 Days |
| EXAMPLE 3 A | 0 | 5:03 | 7:21 | 87 | 244 | 378 | 6.4 |
| | 5 | 4:11 | 5:46 | 94 | 241 | 362 | 15.2 |
| | 10 | 5:46 | 7:24 | 97 | 220 | 340 | 20.0 |
| | 15 | 8:35 | 10:10 | 89 | 221 | 334 | 20.6 |
| | 20 | 9:40 | 11:05 | 50 | 162 | 330 | 21.1 |
| | 25 | 11:15 | 13:30 | 37 | 118 | 310 | 21.5 |
| 4 B | 10 | 7:51 | 9:42 | 91 | 240 | 345 | 26.8 |
| COMPT. 5 C | 5 | 5:43 | 7:45 | 135 | 285 | 415 | 15.5 |
| | 10 | 2:15 | 4:05 | 72 | 192 | 320 | 5.2 |
| | 15 | 0:17 | 2:18 | 69 | 199 | 305 | 2.4 |
| | 20 | 0:25 | 1:40 | 71 | 182 | 302 | 2.1 |

A, B, C, D and E in Table 4 means;
A: $LiNO_2$ Solid Content/Cement (Weight Ratio)
B: SBR Resin/Cement (Weight Ratio)
C: $Ca(NO_2)$ Solid Content/Cement (Weight Ratio)
D: Compressive Strength $KgF/cm^2$
E: Adhesive Strength $KgF/cm^2$
Methods of Tests;
Setting Time JIS A6204 (Attached Paper I applie)
Compressive Strength FIS R5201
Adhesive Strength JIS A6916

As seen from the above, covering cement mortar mixed with lithium nitrite according to the invention does not adversely affect on workability without considerably shortening setting time in comparison with calcium nitrite. Compressive strength thereof is almost same with mortar added with no lithium nitrite but adhesive strength is considerably improved by addition of lithium nitrite. Owing to addition of the resin the adhesiveness can be further improved.

As seen from the above, lithium nitrite can be continuously supplied for a considerably long time to hardened cementitious material which has been deteriorated or is anticipated to be deteriorated into far deeper portions thereof so as to suppress salt damage and undesirable alkali-aggregate reaction. Furthermore, covering cementitious material can be applied similar to usual finishing coating.

What is claimed is:

1. A method for preventing a hardened cementitious material from deteriorating comprising the steps of:
    (a) applying a cement paste, mortar or concrete composition containing 1-25 weight % of lithium nitrite relative to the cement content, so as to cover the surface of a hardened cementitious material, and
    (b) allowing said composition to harden.

2. The method as claimed in claim 1, wherein the hardened cementitious material contains salt.

3. The method as claimed in claim 1, wherein the hardened cementitious material contains an aggregate which reacts with alkali in said material.

* * * * *